United States Patent
Frenkel et al.

(10) Patent No.: US 12,365,702 B2
(45) Date of Patent: Jul. 22, 2025

(54) PROCESS FOR THE PRODUCTION OF ALKYLTIN HALIDES

(71) Applicant: GALATA CHEMICALS LLC, Southbury, CT (US)

(72) Inventors: Peter Frenkel, Danbury, CT (US); Joseph Salsbury, Southbury, CT (US); Steven McKeown, Southbury, CT (US)

(73) Assignee: GALATA CHEMICALS LLC, Southbury, CT (US)

( * ) Notice: Subject to any disclaimer, the term of this patent is extended or adjusted under 35 U.S.C. 154(b) by 1039 days.

(21) Appl. No.: 17/012,090

(22) Filed: Sep. 4, 2020

(65) Prior Publication Data
US 2020/0399294 A1    Dec. 24, 2020

Related U.S. Application Data

(63) Continuation of application No. PCT/US2019/020560, filed on Mar. 4, 2019.

(60) Provisional application No. 62/639,015, filed on Mar. 6, 2018.

(51) Int. Cl.
*C07F 7/22* (2006.01)
*B01D 3/40* (2006.01)

(52) U.S. Cl.
CPC .............. *C07F 7/2208* (2013.01); *B01D 3/40* (2013.01); *C07F 7/2296* (2013.01)

(58) Field of Classification Search
CPC ......... B01D 3/40; C07F 7/2208; C07F 7/2296
See application file for complete search history.

(56) References Cited

U.S. PATENT DOCUMENTS

| | | |
|---|---|---|
| 3,248,411 A | 4/1966 | Neumann et al. |
| 3,390,159 A | 6/1968 | Katsumura |
| 3,459,779 A | 8/1969 | Neumann |
| 3,971,817 A | 7/1976 | Jung et al. |
| 3,994,944 A | 11/1976 | Buschhoff et al. |
| 4,968,823 A * | 11/1990 | Kiyama ................ C07F 7/2296 556/89 |
| 8,633,330 B2 | 1/2014 | Merz, III et al. |
| 2004/0011998 A1 * | 1/2004 | Barda ................... C07F 7/2224 252/399 |
| 2010/0190902 A1 * | 7/2010 | Krainer .................. C07F 7/226 556/87 |
| 2013/0281725 A1 * | 10/2013 | Merz, III .............. C07F 7/2208 556/102 |

FOREIGN PATENT DOCUMENTS

| | | |
|---|---|---|
| AT | 233021 B | 4/1964 |
| DE | 102016217012 A1 | 3/2017 |

OTHER PUBLICATIONS

Sander Thoonen et al., "Selective synthesis of monoorganotin trihalides: the direct reaction of allylic halides with tin(II) halides catalyzed by platinum and palladium complexes", Tetrahedron, vol. 59, Issue 51, Dec. 15, 2003, pp. 10261-10268 (abstract only).
Sander H.L. Thoonen et al., "Synthetic aspects of tetraorganotins and organotin(IV) halides", Journal of Organometallic Chemistry vol. 689, Issue 13, Jul. 1, 2004, pp. 2145-2157 (abstract only).
International Search Report and Written Opinion issued in International Application No. PCT/US2019/020560, Mailed Apr. 29, 2019, 15 pages.

* cited by examiner

*Primary Examiner* — Pancham Bakshi
(74) *Attorney, Agent, or Firm* — DILWORTH IP, LLC

(57) ABSTRACT

A process comprising:
(a) contacting a feed stream comprising a di-alkyltin dihalide distillate with an alkylation agent, thereby forming an alkylated mixture comprising $R_4Sn$ and optionally $R_3SnX$, $R_2SnX_2$, or mixtures thereof, where R is a linear, branched or cyclic $C_1$-$C_{20}$ alkyl, and X is a halide;
(b) contacting the alkylated mixture with $SnX_4$, thereby forming an alkyltin halide mixture comprising $RSnX_3$, $R_2SnX_2$, and optionally impurities, $R_3SnX$ or mixtures thereof;
(c) separating by distillation the alkyltin halide mixture to form a mono-alkyltin halide-rich distillate stream and a liquid di-alkyltin halide-rich bottoms stream comprising $R_2SnX_2$, $RSnX_3$, and optionally impurities, $R_3SnX$, or mixtures thereof;
(d) separating by distillation the di-alkyltin halide-rich bottoms stream, thereby forming the liquid di-alkyltin dihalide distillate comprising $R_2SnX_2$, and optionally $RSnX_3$, $R_3SnX$ or mixtures thereof, and an impurities-rich bottoms stream; and
(e) recycling a part, $x_{recycle}$, of the liquid di-alkyltin dihalide distillate to step (a), where $x_{recycle}$ ranges from greater than 0.0% to 100.0% of the distillate.

21 Claims, No Drawings

PROCESS FOR THE PRODUCTION OF ALKYLTIN HALIDES

FIELD OF THE INVENTION

The invention relates to a process for the preparation of high purity mono-alkyltin trihalides with recycling of the dialkyltin dihalide by-product, where both the mono- and di-alkyltins can be obtained with low color, and the use of such alkyltin chlorides for manufacturing alkyltin catalysts and heat stabilizers.

BACKGROUND

Halogen-containing polymers, such as polyvinylchloride (PVC), are some of the most widely used plastics in the world. In particular, PVC is widely used in such applications as pipes and pipe fittings, film and sheet, flooring, cables and construction profiles. However, PVC can decompose during processing, upon heating or on prolonged exposure to sunlight due to loss of HCl from the polymer, resulting in discoloration and embrittlement. Heat stabilizers made from mono- and di-alkyltin halide compounds are often utilized in formulations containing PVC to minimize such deterioration. The alkyltin compositions also find use as catalysts for polyurethane production and precursors for the deposition of $SnO_2$-coatings on glass. The alkyltin halide compositions are typically produced commercially in redistribution reactions where mixtures of mono-, di-, and tri-alkyltin halides are present. Of these, mono-alkyltin trihalide is often preferred as the predominant component of such mixtures, with lower amounts of the di-alkyltin material, due to the mono-alkyltin's reduced toxicity. In particular, high purity mono-alkyltin compounds have been widely used commercially in recent years. The di-alkyltin compounds are most often used in mixtures with the mono-alkyltin compounds. Production of the tri-alkytin compounds is normally avoided due to toxicity concerns.

Improved processes for the production of mono-alkyltin halides have been an area of research. It is known to employ cyclic processing systems where separated alkyltin halide products of the redistribution reactions are re-alkylated and then recycled back to a redistribution reaction, to preserve fresh feed of tin molecules in the form desired. For example, when di-alkyltin halide compounds are desired, the mono- and tri-alkyltin halide compounds resulting from the redistribution reactions can be separated from the di-material and then recycled to an alkylation step for subsequent conversion in the redistribution reactions. Further, alkylation and recycle of separated di-alkyltin halides to a redistribution reaction for maximizing mono-alkyltin halides is known (Tetrahedron 59 (2003) 10261-10268). U.S. Pat. No. 8,633, 330 ('330 Patent) discloses a process for producing mono-alkyltin tri-halides where a portion of a dialkyltin dihalide stream is recycled to a step where it is contacted with an alkylation agent.

DE102016217012 describes a process for making mono-octyltin trichloride (MOTC) of high purity employing an extraction step (with 5% aqueous HCl solution at about 55° C.) to separate MOTC from a mixture consisting of MOTC, tri-octyltin chloride and dioctyltin dichloride that is formed as a result of a reaction between tin tetrachloride and tetraoctyltin (TOT) at 50° C. The separated organic phase, predominantly consisting of tri-octyltin chloride, can be recycled to TOT with tri-octyl aluminum (in accordance with U.S. Pat. No. 3,994,944) or via a Grignard reaction with an ether solution of octyl-magnesium chloride (Journal of Organometallic Chemistry (2004), 689 (13), 2145).

However, while the recycle of alkyltin halides for alkylation and subsequent feeding to a redistribution reaction is known, a disadvantage of such processes is that continuous or repeated recycle results in a buildup of discolored impurities that are produced in the associated reactions. These adversely affect the color of the obtained chlorides as well as the color of the alkyltin stabilizers and catalysts derived from the chlorides. Typically, the color of organotin stabilizers and catalysts should not exceed 2 units on the Gardner scale to meet commercial quality standards because alkyltin chlorides of dark color do not allow for manufacturing alkyltin heat stabilizers and catalysts that meet the color standards for the respective applications.

Nevertheless, a continuing need exists for improved processes for producing alkyltin based heat stabilizers. In particular, there is an ongoing need for improved processes for producing alkyltin compounds of high purity with low color.

SUMMARY OF THE INVENTION

The subject matter of the present disclosure relates to an improved process for efficiently producing high purity mono-alkyltin and di-alkyltin halide compositions and the corresponding heat stabilizers and catalysts, with low color. It has unexpectedly been discovered that high purity mono-alkyltin halides can be produced efficiently in a recycle process, while also maintaining low color of the mono- and di-alkyltin compounds when the separated dialkyltin dihalide is purified by distillation prior to recycle to the alkylation step.

In one embodiment, the present disclosure provides a process comprising: (a) contacting a feed stream comprising a di-alkyltin dihalide distillate with an alkylation agent, thereby forming an alkylated mixture comprising $R_4Sn$, and optionally $R_3SnX$, $R_2SnX_2$, or mixtures thereof, where R is a linear, branched or cyclic $C_1$-$C_{20}$ alkyl, and X is a halide; (b) contacting the alkylated mixture with $SnX_4$, thereby forming an alkyltin halide mixture comprising $RSnX_3$, $R_2SnX_2$, and optionally impurities, $R_3SnX$ or mixtures thereof; (c) separating by distillation the alkyltin halide mixture to form a mono-alkyltin rich distillate stream and a liquid di-alkyltin dihalide rich bottoms stream comprising $R_2SnX_2$, $RSnX_3$ and optionally, impurities, $R_3SnX$ or mixtures thereof; (d) separating by distillation the di-alkyltin dihalide-rich bottoms stream, thereby forming the liquid di-alkyltin dihalide distillate having a Gardner color value of at most 3, comprising $R_2SnX_2$, and optionally $RSnX_3$, $R_3SnX$ or mixtures thereof; and an impurities-rich bottoms stream; and (e) recycling a part, $x_{recycle}$, of the liquid di-alkyltin dihalide distillate to step (a), where $x_{recycle}$ ranges from greater than 0.0% to 100.0% of the di-alkyltin dihalide distillate product.

In another embodiment, the present disclosure provides a process comprising: (a) contacting a feed stream comprising a di-alkyltin dihalide distillate with a tri-alkyl aluminum compound, thereby forming an alkyltin halide mixture comprising $RSnX_3$, $R_2SnX_2$, impurities, and optionally, $R_3SnX$; (b) separating by distillation the alkyltin halide mixture to form a mono-alkyltin halide-rich distillate stream and a liquid di-alkyltin halide-rich bottoms stream comprising $R_2SnX_2$, impurities, and optionally $RSnX_3$, $R_3SnX$ or mixtures thereof; (c) separating by distillation the di-alkyltin halide-rich bottoms stream thereby forming the liquid di-alkyltin dihalide distillate having a Gardner color value of at most 3, and comprising $R_2SnX_2$, and optionally $RSnX_3$, $R_3SnX$ or mixtures thereof; and an impurities-rich bottoms stream; and (d) recycling a fraction, $x_{recycle}$, of the liquid di-alkyltin dihalide distillate product to step (a), where $x_{recycle}$ ranges from greater than 0.0% to 100.0% of the distillate product.

DETAILED DESCRIPTION OF THE INVENTION

The present disclosure provides a process for efficiently producing high purity monoalkyltin halide compounds along with dialkyltin dihalide streams of low color. Step (a) in the process comprises contacting a feed stream comprising a di-alkyltin dihalide distillate product with an alkylation agent, thereby forming an alkylated mixture comprising from $R_4Sn$, and optionally, $R_3SnX$, $R_2SnX_2$, or mixtures thereof, where R is a linear, branched or cyclic $C_1$-$C_{20}$ alkyl, and X is a halide. Preferably, R is a $C_3$-$C_{10}$ alkyl. More preferably, R is a $C_4$-$C_8$ alkyl. Most preferably, R is n-octyl. Preferably, X is chlorine or bromine. More preferably, X is chlorine. Preferably, the alkylation agent is selected from a $C_1$-$C_{20}$ trialkylaluminum compound, $C_1$-$C_{20}$ alkylmagnesium halide compound or mixtures thereof. More preferably, the alkylation agent is selected from tri-n-butyl aluminum, tri-n-octyl aluminum, n-butylmagnesium chloride and n-octylmagnesium chloride. In the alkylation reaction, $RSnX_3$, $R_2SnX_2$, $R_3SnX$ and $R_4X$ are alkylated to a mixture containing $R_3SnX$ and $R_4Sn$. Typically, the alkylated mixture contains 70 to 100% $R_4Sn$, 0 to 30% $R_3SnX$, and less than 10% $R_2SnX_2$ based on the total weight of the alkylated mixture. Preferably, the alkylated mixture contains 80 to 95% $R_4Sn$, 5 to 20% $R_3SnX$, and less than 5% $R_2SnX_2$. The alkylation step ultimately converts the form of the tin-containing species to $R_4Sn$, which is useful in the subsequent redistribution reaction for producing $RSnX_3$.

In step (b) of the process the alkylated mixture described above is contacted with $SnX_4$, thereby forming an alkyltin halide mixture comprising $RSnX_3$, $R_2SnX_2$, and optionally, impurities, $R_3SnX$ or mixtures thereof. The alkyltin mixture is often discolored. The color of the alkyltin halide mixture is caused by the impurities present in the alkylated mixture, which include residual raw materials and by-products from the reactions with $SnX_4$. These by-products typically may include impurities produced in all steps (a)-(e), and contain ligand precursors, hydrolyzed ligand precursors, solvents, alkenes, alkyl halides, neutralization salts or mixtures thereof. Preferably, the Gardner color of the alkyltin mixture can be in the range of 8 to 18, 5 to 18 or 4 to 18. The higher level of Gardner color is reflective of the increased levels of impurities due to the recycle stream of the process.

The alkyltin halide mixture typically contains 50.0 to 99.0 wt % $RSnX_3$, 1.0 to 50.0 wt % $R_2SnX_2$, 0.0 to 2.0 wt % $R_3SnX$ and less than 5.0 wt % other impurities, based on the total weight of the alkyltin mixture. Preferably, the alkyltin mixture contains 60.0 to 99.0 wt % $RSnX_3$, 1.0 to 40.0 wt % $R_2SnX_2$, 0.0 to 1.0 wt % $R_3SnX$ and less than 4 wt % other impurities, based on the total weight of the alkyltin halide mixture.

In step (c) of the process, the alkyltin halide mixture is separated by distillation to form a mono-alkyltin halide-rich distillate stream and a liquid di-alkyltin halide-rich bottoms stream. Such a process can be conducted batch-wise or continuously. Preferably, the separation is conducted continuously. One skilled in the art would understand that conventional separation equipment can be employed for the process, and that the conditions of the distillation separation are selected by the required separation. The distillate stream is rich in the mono-alkyltin halide component. Preferably, the mono-alkyltin halide-rich distillate stream contains 90.0 to 100 wt % $RSnX_3$, 0.0 to 10.0 wt % $R_2SnX_2$, and less than 1.0 wt % $R_3SnX$, based on the total weight of the mono-alkyltin rich distillate stream. More preferably, the mono-alkyltin rich distillate stream contains 92.0 to 100 wt % $RSnX_3$, 0.0 to 8.0 wt % $R_2SnX_2$, and less than 0.5 wt % $R_3SnX$, based on the total weight of the mono-alkyltin halide-rich distillate stream. The mono-alkyltin rich distillate has a Gardner color of less than 2.0. Preferably, the mono-alkyltin rich distillate has a Gardner color of at most 1.0.

Preferably, the dialkyltin halide-rich bottoms stream contains 3.0 to 30.0 wt % $RSnX_3$, 70.0 to 97.0 wt % $R_2SnX_2$, 0 to 5.0 wt % $R_3SnX$, and less than 5 wt % other impurities based on the total weight of the dialkyltin halide-rich bottoms stream. Such a distillation separation step not only allows the recovery of a high-purity monoalkyltin stream but concentrates the other discolored components of the alkyltin halide mixture in a stream that can be subsequently treated. Preferably, the distillate stream has a boiling point of 150-250° C. at less than 10 mm Hg.

In step (d) of the process, the di-alkyltin halide-rich bottoms stream is separated by distillation, thereby forming the liquid di-alkyltin dihalide distillate with a Gardner color value of at most 3, comprising $R_2SnX_2$, and optionally $RSnX_3$, $R_3SnX$ and mixtures thereof, and an impurities-rich bottoms stream. Preferably, the di-alkyltin dihalide distillate has a Gardner color of at most 2. More preferably, the di-alkyltin dihalide distillate has a Gardner color of less than or equal to 1. This reduction in Gardner color reflects the purification of the di-alkyltin dihalide distillate, and the corresponding concentration of impurities in the impurities-rich bottoms stream. Preferably, distillation of the dialkyltin dihalide-containing still bottoms stream is conducted at a temperature of 200-220° C. and less than 5 mm Hg vacuum. Typically, the di-alkyltin dihalide distillate contains 90 to 100 wt % $R_2SnX_2$, 0.0 to 10 wt % $RSnX_3$, and 0.0 to 3.0 wt % $R_3SnX$. The impurities-rich bottoms stream can either be disposed of or treated for reclaiming tin metal or its salts.

There is a reduction in color intensity of the mono-alkyltin halide rich stream and dialkyltin dihalide distillate produced according to the process of the current subject matter when compared to processes that do not include the above-described separation step performed on the dihalide recycle stream. The di-alkyltin dihalide distillate produced according to the process of the present subject matter will typically exhibit a reduction in Gardener color of at least 25% compared to similar streams prepared without recycle. Reduction of the color intensity in the di-alkyltin dihalide stream relative to similar streams using recycle but no separation of the recycle stream is at least 25%, preferably at least 50%.

The reduction in color intensity resulting from the process of the present subject matter is reflected in other intermediate streams of the process, as well as derivatives produced from the mono-alkyltin halide and the di-alkyltin halide streams produced in the process. For example, as shown in Table 1 of Example 1 and Example 2, the tetra-octyltin (TOT) produced from the recycled dioctyltin dichloride distillate in the process of the present subject matter demonstrates up to a 66% lower Gardener color (from 3 to 1) than TOT produced without using dioctyltin dichloride as a starting material (shown as Control). Relative to a recycling process which does not require distillation of the di-alkyltin dihalide recycle stream, the process of the present subject matter provides up to a 90% lower Gardner color (10 to 1).

Further, as shown in Table 3 and Example 3, thioglycolate derivatives of the di-alkyltin dihalide distillate produced according to the process of the present subject matter exhibit up to a 90% lower Gardner color (10 to 1) relative to thioglycolate derivatives produced from di-alkyltin dihalide material from a process using recycle but which does not distill-separate the di-halide recycle stream.

In step (e) of the process, a part of the liquid di-alkyltin dihalide distillate is recycled to step (a) of the process (re-alkylation). That part of the stream recycled, $x_{recycle}$ typically ranges from greater than 0.0% to 100.0% of the distillate. Preferably, $x_{recycle}$ ranges from 10.0 to 100%. More preferably, $x_{recycle}$ ranges from 30.0 to 100%. Even more preferably, $x_{recycle}$ ranges from 50.0 to 100%.

The portion of the distillate that is not recycled, as well as a portion of the non-distilled di-alkyltin halide rich bottoms stream can either be reacted with thioesters, such as a mercaptoacetic acid ester selected from iso-octylmercaptoacetate, 2-ethylhexyl-mercaptoacetate, and n-octylmercaptoacetate, to form a di-alkyltin bis(thioglycolate ester) stabilizer or a catalyst; reacted with $C_2$-$C_{14}$ linear or branched organic acids to form a di-alkyltin dicarboxylate stabilizer or a catalyst; converted to dialkyltin oxide; or be used as-is in an application requiring di-alkyltin dihalide material. For example, the portion of the distillate that is not recycled, can also be reacted with an organic acid selected from the group consisting of 2-ethylhexanoic acid, neodecanoic acid, lauric acid, myristic acid, oleic acid, and stearic acid to form a di-alkyltin bis-carboxylate-containing stabilizer or a catalyst. Finally, the portion of the distillate that is not recycled, can also be reacted with water to form a di-alkyltin oxide-containing catalyst. Preferably, the mercaptoacetic acid ester is 2-ethylhexyl thioglycolate.

The mono-alkyltin trihalide distillate can be reacted with a mercaptoacetic acid ester selected from iso-octylmercaptoacetate, 2-ethylhexyl-mercapto acetate, and n-octylmercaptoacetate, to form the corresponding mono-alkyltin thioglycolate ester stabilizers.

Step (b) can be omitted if the alkylating agent in the contacting step (a) is tri-alkyl aluminum. The preferred tri-alkyl aluminums are tri-butyl aluminum and tri-octyl aluminum.

In another embodiment, the present disclosure provides a process comprising first contacting a feed stream comprising a di-alkyltin dihalide distillate with a tri-alkyl aluminum compound, thereby forming an alkyltin halide mixture comprising $RSnX_3$, $R_2SnX_2$, impurities, and optionally, $R_3SnX$; the alkyltin halide mixture having a Gardner color value greater than 4. The alkyltin halide mixture is then separated by distillation to form a mono-alkyltin halide-rich distillate stream and a liquid di-alkyltin dihalide-rich bottoms stream comprising $R_2SnX_2$, impurities, and optionally, $RSnX_3$, $R_3SnX$ or mixtures thereof. Next, the di-alkyltin halide-rich bottoms stream is separated by distillation, thereby forming the liquid di-alkyltin dihalide distillate, comprising $R_2SnX_2$, and optionally, $RSnX_3$, $R_3SnX$ or mixtures thereof; and an impurities-rich bottoms stream. Finally, a fraction, $x_{recycle}$, of the liquid di-alkyltin dihalide distillate is recycled to step (a), where $x_{recycle}$ ranges from greater than 0.0% to 100.0% of the distillate product.

Stabilized Polymer Compositions

The heat stabilizers produced from the process of the present disclosure, halogen-containing polymers, and other additives present can be blended via compounding by well-known processes such as extrusion, calendaring, molding and combinations thereof. Compounding of the halogen-containing polymer and the stabilizer composition can also include first blending the components into a dry blends followed by compounding.

Halogen-Containing Polymers

The halogen-containing polymers include homopolymers and copolymers of vinyl halogens, post-halogenated polymers and co-polymers of vinyl halogens, and halogenated polymers of olefins, such as ethylene, propylene, and 1-butene. The halogen of such polymers can be fluorine, chlorine, bromine, iodine, or mixtures thereof.

Preferably, the halogen-containing polymer is selected from polyvinyl chloride, polyvinylidene chloride (PVC), chlorinated polyvinyl chloride ("CPVC") or mixtures thereof. More preferably, the halogen-containing polymer is polyvinyl chloride. The PVC can be obtained via polymerization in bulk or in suspension, in emulsion, in micro suspension, or in suspended emulsion.

As employed herein, the term PVC is intended to include both homopolymers and copolymers of vinyl chloride, i.e., vinyl resins containing vinyl chloride units in their structure, e.g., copolymers of vinyl chloride and vinyl esters of aliphatic acids, in particular vinyl acetate; copolymers of vinyl chloride with esters of acrylic and methacrylic acid and with acrylonitrile; copolymers of vinyl chloride with diene compounds and unsaturated dicarboxylic acids or anhydrides thereof, such as copolymers of vinyl chloride with diethyl maleate, diethyl fumarate or maleic anhydride; post-chlorinated polymers and copolymers of vinyl chloride; copolymers of vinyl chloride and vinylidene chloride with unsaturated aldehydes, ketones and others, such as acrolein, crotonaldehyde, vinyl methyl ketone, vinyl methyl ether, vinyl isobutyl ether, and the like.

The term PVC as employed herein is also intended to include graft polymers of PVC with ethyl-vinyl acetate ("EVA"), acrylonitrile/butadiene-styrene ("ABS"), and meth-acrylate-butadiene ("MBS"). Preferred substrates are also mixtures of the above-mentioned homopolymers and copolymers, preferably vinyl chloride homopolymers, with other thermoplastic and/or elastomeric polymers, more preferably blends with ABS, MBS, acrylonitrile butadiene ("NBR"), styrene-acrylonitrile ("SAN"), EVA, chlorinated polyethylene ("CPE"), poly(methyl methylacrylate), ethylene propylene diene monomer ("EPDM"), and polylactones. Preferably, vinyl acetate, vinylidene dichloride, acrylonitrile, chlorofluoroethylene and/or the esters of acrylic, fumaric, maleic and/or itaconic acids are monomers that are copolymerizable with vinyl chloride.

The content of the subject heat stabilizer composition within the stabilized polymer composition is typically between 0.01 parts and 10 parts by weight, preferably between about 0.1 and 7.0, and more preferably between 0.25 and 5.0 parts by weight for 100 parts by weight of the halogen-containing polymer.

EXAMPLES

The following examples further detail and explain the inventive process of the present disclosure and demonstrate their efficacy for producing alkyltin compounds with high efficiency and low color. Those skilled in the art will recognize many variations that are within the spirit of the invention and scope of the claims.

Control Example 1

A series of experiments were performed to simulate the effects of recycling dialkyltin dihalide separated from a mixture with mono-alkyltin trihalide (from a redistribution reaction step) to an alkylation step, followed by an additional redistribution reaction step, identical to Example 3 in the '330 Patent. A total of five cycles were performed. Each cycle included:

Redistribution reaction (step (b)) between tetra-octyltin (TOT) (made in step (a) from the recycled di-octytin dichloride (DOTC)) and tin tetra-chloride ($SnCl_4$)

Distillation of mono-octyltin trichloride (MOTC) (step c) from the material obtained in step (b)) and formation of the still bottoms containing DOTC and the MOTC impurity Grignard re-alkylation (step a) of the still bottoms obtained in step (d)) using n-octytin-magnesium chloride to form TOT.

Grignard Re-Alkylation Reaction (Steps a)

The Grignard re-alkylation reaction of the non-distilled DOTC still bottoms to form TOT was completed over 30 min at 120° C. Color of the TOT obtained after each cycle with the use of the non-distilled DOTC stilled bottoms is listed in Table 1 as measured on the Gardner color scale in accordance with ASTM D1544. The increase in color is caused by the buildup of chromophoric impurities formed as a result of conducting several cycles of the multi-step reaction sequence.

TABLE 1

Color of TOT (octyltin stream) obtained after step (a)

| Cycle Number | 0 (standard quality) | 1 | 2 | 3 | 4 | 5 |
|---|---|---|---|---|---|---|
| Gardner Color | 3 | 7 | 8 | 10 | 9 | 10 |

The color of TOT reached 10 units on the Gardner color scale after cycle 3, while color of the standard TOT (obtained in a standard process that does not involve recycling DOTC, where the color, measured on the Gardner color scale in accordance with ASTM D1544, was 3 (as shown for cycle 0).

Redistribution Reaction (Step b)

Redistribution reactions between tetra-octyltin (TOT) made in step (a) from the recycled non-distilled DOTC and $SnCl_4$ were conducted for 2 hours at 120° C. For the first cycle, fresh material was used. The obtained (DOTC)/(MOTC)/tri-octyltin monochloride (TOTC) mixtures were darker than the material of the standard quality. The color reached a maximum of 18 units on the Gardner scale in the $4^{th}$ cycle, and it represents the buildup of color-forming impurities normally associated with the recycling step. The color values are summarized in Table 2.

TABLE 2

Color of the redistribution octyltin mixture obtained after step (b)

| Cycle | 1 | 2 | 3 | 4 | 5 |
|---|---|---|---|---|---|
| Gardner Color | 8 | 11 | 12 | 18 | 12 |

Distillation, Separation & Thioglycolate Derivatization

The DOTC/MOTC/TOTC mixture from step (b), was separated by distillation step (c) to form a high purity MOTC distillate containing 99 wt % MOTC and 1 wt % DOTC, and a DOTC still bottoms stream containing 84-90 wt % DOTC, 9-16 wt % MOTC and less than 0.1 wt % TOTC. The distillation was carried out at 5-10 mbar and 140° C. head temperature. A portion of the non-distilled (in accordance with the '330 Patent) DOTC still bottoms was derivatized with 2-ethylhexyl thioglycolate (EHTG) to form an octyltin thioglycolate ester stabilizer. The color of the prepared liquid samples was measured on the Gardner color scale in accordance with ASTM D1544. Stabilizers obtained using the non-distilled DOTC still bottoms were significantly darker than the one made with the DOTC still bottoms distillate. The color of the samples made with the non-distilled DOTC measured on the Gardner color scale increased with each cycle, reached 10 units after the $4^{th}$ cycle and remained about the same after the $5^{th}$ cycle, which reflect the buildup in color-forming impurities associated with the multi-step multiple recycling process sequences if it is conducted without distilling the DOTC stream. The color values are listed in Table 3.

TABLE 3

Color of the octyltin stabilizers obtained as a result of derivatization of non-distilled DOTC still bottoms with EHTG

| Cycle | 1 | 2 | 3 | 4 | 5 |
|---|---|---|---|---|---|
| Gardner Color | 7 | 8 | 9 | 10 | 10 |

Example 2

A series of experiments were performed as in Control Example 1 (Table 1) to simulate the effects of recycling DOTC separated from a mixture with MOTC, except that prior to recycling (step e) of the DOTC stream into the re-alkylation step (step a), the DOTC still bottoms stream was distilled (step d) at 210° C. and 3 mm Hg vacuum into a DOTC distillate stream containing 97 wt % DOTC and 3 wt % MOTC. The color of the TOT obtained after recycling the distilled DOTC-containing still bottoms into the (re)alkylation step in accordance with the process of the present invention was measured to be 1 on the Gardner scale. This result in color intensity (Gardner 1) is substantially lower than that obtained either with the use of the non-distilled DOTC in the recycling process of the prior art (Gardner 7-10, Table 1) or in the standard process that does not involve the DOTC-recycling step (Gardner 3, Table 1). Therefore, distillation of the DOTC stream as in the process of the invention's process sequence enables recycling for an unlimited number of times, while maintaining the desirable quality (in terms of color/discoloration) of the produced alkyltin intermediates.

Example 3

A series of experiments were performed as in Example 2 to simulate the effects of recycling the distilled DOTC separated from a mixture with MOTC on the color of a octyltin thioglycolate ester obtained from it. The color of the octyltin thioglycolate ester stabilizer derived from the distilled DOTC-containing still bottoms and EHTG in accordance with the process of the present invention was found to be 1 on the Gardner scale. This is substantially lower than that obtained with use of the non-distilled DOTC in the recycling process of the prior art (Gardner 7-10, Table 3). Therefore, distillation of the DOTC stream as in the process of the invention's process sequence enables recycling for an unlimited number of times, while maintaining the desirable quality (in terms of color/discoloration) of the produced alkyltin intermediates.

Therefore, distillation of the DOTC stream enables conducting the recycling process of this invention's process sequence unlimited number of times, and maintain the desirable quality (in terms of color/discoloration) of the produced alkyltin stabilizer and catalyst products.

Thus, examples 2 and 3 demonstrate the reduction in color of the TOT intermediate and the octyltin thioglycolate derived from it as a result of the process of the present subject matter.

Other features, advantages and embodiments of the invention disclosed herein will be readily apparent to those exercising ordinary skill after reading the foregoing disclosure. In this regard, while specific embodiments of the invention have been described in considerable detail, variations and modifications of these embodiments can be affected without departing from the spirit and scope of the invention as described and claimed.

We claim:

1. A process for producing mono-alkyltin and di-alkyltin bis(thioglycolate ester) streams comprising:
    (a) contacting a feed stream comprising a di-alkyltin dihalide distillate with an alkylation agent, thereby forming an alkylated mixture comprising $R_4Sn$ and optionally $R_3SnX$, $R_2SnX_2$, or mixtures thereof, where R is a linear, branched or cyclic $C_1$-$C_{20}$ alkyl, and X is a halide;
    (b) contacting the alkylated mixture with $SnX_4$, thereby forming an alkyltin halide mixture comprising $RSnX_3$, $R_2SnX_2$, and chromophoric impurities, $R_3SnX$ or mixtures thereof;
    (c) separating by distillation the alkyltin halide mixture to form a mono-alkyltin halide-rich distillate stream having a boiling point of 150-250° C. at less than 10 mm Hg and a liquid di-alkyltin halide-rich bottoms stream comprising 70.0 to 97.0 wt % $R_2SnX_2$, 3.0 to 30.0 wt % $RSnX_3$, chromophoric impurities, and optionally $R_3SnX$;
    (d) separating by distillation the liquid di-alkyltin halide-rich bottoms stream at a temperature of 200-220° C. at less than 5 mm Hg vacuum, thereby forming a separated liquid di-alkyltin dihalide distillate comprising 90.0 to 100.0 wt % $R_2SnX_2$, and at most 10.0 wt % $RSnX_3$, having a Gardner color value of 2 or less, and an impurities-rich bottoms stream comprising chromophoric impurities;
    (e) recycling a part, $X_{recycle}$, of the separated liquid di-alkyltin dihalide distillate to step (a), thereby forming a recycled dihalide distillate stream and a non-recycled dihalide distillate stream, where $X_{recycle}$ ranges from greater than 10.0% to 90.0% of the separated liquid di-alkyltin dihalide distillate;
    (f) reacting the non-recycled liquid di-alkyltin dihalide distillate with iso-octylmercaptoacetate, 2-ethylhexylmercaptoacetate, or n-octylmercaptoacetate, to form the corresponding di-alkyltin bis(thioglycolate ester)-containing stabilizer, wherein the di-alkyltin bis(thioglycolate ester)-containing stabilizer has a Gardner color value of at most 3.

2. The process of claim 1 wherein the separated liquid di-alkyltin dihalide distillate comprises $R_2SnX_2$ and $RSnX_3$.

3. The process of claim 1 wherein the separated liquid di-alkyltin dihalide distillate comprises $R_2SnX_2$ and $R_3SnX$.

4. The process of claim 3 wherein the separated liquid di-alkyltin dihalide distillate further comprises $RSnX_3$.

5. The process of claim 1 wherein the alkylation agent is selected from a $C_1$-$C_{20}$ tri-alkylaluminum compound, or a $C_1$-$C_{20}$ alkylmagnesium halide compound.

6. The process of claim 1 wherein R is n-octyl.

7. The process of claim 1 wherein the halide is chloride.

8. The process of claim 1 wherein $RSnX_3$ is mono-n-octyltin trichloride.

9. The process of claim 1 wherein $R_2SnX_2$ is di-n-octyltin dichloride.

10. The process of claim 1 wherein $X_{recycle}$ is 30.0% to 80.0%.

11. The process of claim 10 wherein $X_{recycle}$ is 50.0% to 70.0%.

12. The process of claim 1 wherein the mono-alkyltin halide-rich distillate stream of step (c) comprises 90.0 to 100 wt % $RSnX_3$, 0.0 to 10.0 wt % $R_2SnX_2$ and less than 1.0 wt % $R_3SnX$.

13. The process of claim 1 wherein the non-recycled liquid di-alkyltin dihalide distillate is reacted with 2-ethylhexyl mercaptoacetate.

14. The process of claim 1 wherein the Gardner color value of the separated liquid di-alkyltin dihalide distillate of step (d) is at most 1.

15. The process of claim 1 wherein the chromophoric impurities are ligand precursors, hydrolyzed ligand precursors, tin halides, solvents, alkenes, alkyl halides, neutralization salts or mixtures thereof.

16. The process of claim 1 wherein the alkylated mixture formed in step (a) comprises a Gardner color value of at most 3.

17. The process of claim 1 wherein the $R_2SnX_2$ content of the separated liquid di-alkyltin dihalide distillate of step (d) is from 97.0 to 100.0 wt %.

18. A process for producing a di-alkyltin oxide-containing catalyst stream comprising:
    (a) contacting a feed stream comprising a di-alkyltin dihalide distillate with an alkylation agent, thereby forming an alkylated mixture comprising $R_4Sn$ and optionally $R_3SnX$, $R_2SnX_2$, or mixtures thereof, where R is a linear, branched or cyclic $C_1$-$C_{20}$ alkyl, and X is a halide;
    (b) contacting the alkylated mixture with $SnX_4$, thereby forming an alkyltin halide mixture comprising $RSnX_3$, $R_2SnX_2$, and chromophoric impurities, $R_3SnX$ or mixtures thereof;
    (c) separating by distillation the alkyltin halide mixture to form a mono-alkyltin halide-rich distillate stream having a boiling point of 150-250° C. at less than 10 mm Hg and a liquid di-alkyltin halide-rich bottoms stream comprising 70.0 to 97.0 wt % $R_2SnX_2$, 3.0 to 30.0 wt % $RSnX_3$, chromophoric impurities, and optionally $R_3SnX$;
    (d) separating by distillation the liquid di-alkyltin halide-rich bottoms stream at a temperature of 200-220° C. at less than 5 mm Hg vacuum, thereby forming a separated liquid di-alkyltin dihalide distillate comprising 90.0 to 100.0 wt % $R_2SnX_2$, and at most 10.0 wt % $RSnX_3$, having a Gardner color value of 2 or less, and an impurities-rich bottoms stream comprising chromophoric impurities;
    (e) recycling a part, $X_{recycle}$, of the separated liquid di-alkyltin dihalide distillate to step (a), thereby forming a recycled dihalide distillate stream and a non-recycled dihalide distillate stream, where $X_{recycle}$ ranges from greater than 10.0% to 90.0% of the separated liquid di-alkyltin dihalide distillate;
    (f) reacting a first portion of the non-recycled liquid di-alkyltin dihalide distillate with iso-octylmercaptoacetate, 2-ethylhexylmercaptoacetate, or n-octylmercaptoacetate, to form the corresponding di-alkyltin bis (thioglycolate ester)-containing stabilizer, wherein the di-alkyltin bis(thioglycolate ester)-containing stabilizer has a Gardner color value of at most 3, and reacting a second portion of the non-recycled liquid di-alkyltin dihalide distillate with water, thereby forming the di-alkyltin oxide-containing catalyst.

19. A process for producing mono-alkyltin rich and di-alkyltin rich streams comprising:
   (a) contacting a feed stream comprising a liquid di-alkyltin dihalide distillate with a tri-alkyl aluminum compound, thereby forming an alkyltin halide mixture comprising $RSnX_3$, $R_2SnX_2$, chromophoric impurities, and optionally $R_3SnX$ wherein the alkyltin halide mixture formed in step (a) has a Gardner color value of at most 3;
   (b) separating by distillation the alkyltin halide mixture to form a mono-alkyltin halide-rich distillate stream having a boiling point of 150-250° C. at less than 10 mm Hg and a liquid di-alkyltin-rich bottoms stream comprising 70.0 to 97.0 wt % $R_2SnX_2$, 3.0 to 30.0 wt % $RSnX_3$, chromophoric impurities, and optionally $R_3SnX$ or mixtures thereof;
   (c) separating by distillation the liquid di-alkyltin halide-rich bottoms stream at a temperature of 200-220° C. at less than 5 mm Hg vacuum, thereby forming a separated liquid di-alkyltin dihalide distillate comprising 90.0 to 100.0 wt % $R_2SnX_2$, at most 10.0 wt % $RSnX_3$, and optionally $R_3SnX$; and an impurities-rich bottoms stream comprising chromophoric impurities; and
   (d) recycling a fraction, $X_{recycle}$, of the separated liquid di-alkyltin dihalide distillate to step (a), thereby forming a recycled liquid di-alkyltin dihalide distillate stream and a non-recycled liquid di-alkyltin dihalide distillate stream, where $X_{recycle}$ ranges from greater than 10.0% to 90.0% of the distillate product.

20. The process of claim 19 further comprising reacting the non-recycled dihalide distillate with an organic acid selected from the group consisting 2-ethylhexanoic acid, neodecanoic acid, lauric acid, myristic acid, oleic acid, and stearic acid, thereby forming a di-alkyltin bis-carboxylate-containing stabilizer or a catalyst.

21. The process of claim 19 wherein the $R_2SnX_2$ content of the separated liquid di-alkyltin dihalide distillate of step (d) is from 97.0 to 100.0 wt %.

* * * * *